Sept. 7, 1954  A. J. SHMIDL ET AL  2,688,644
PURIFICATION OF METAXYLENE
Filed Sept. 1, 1950
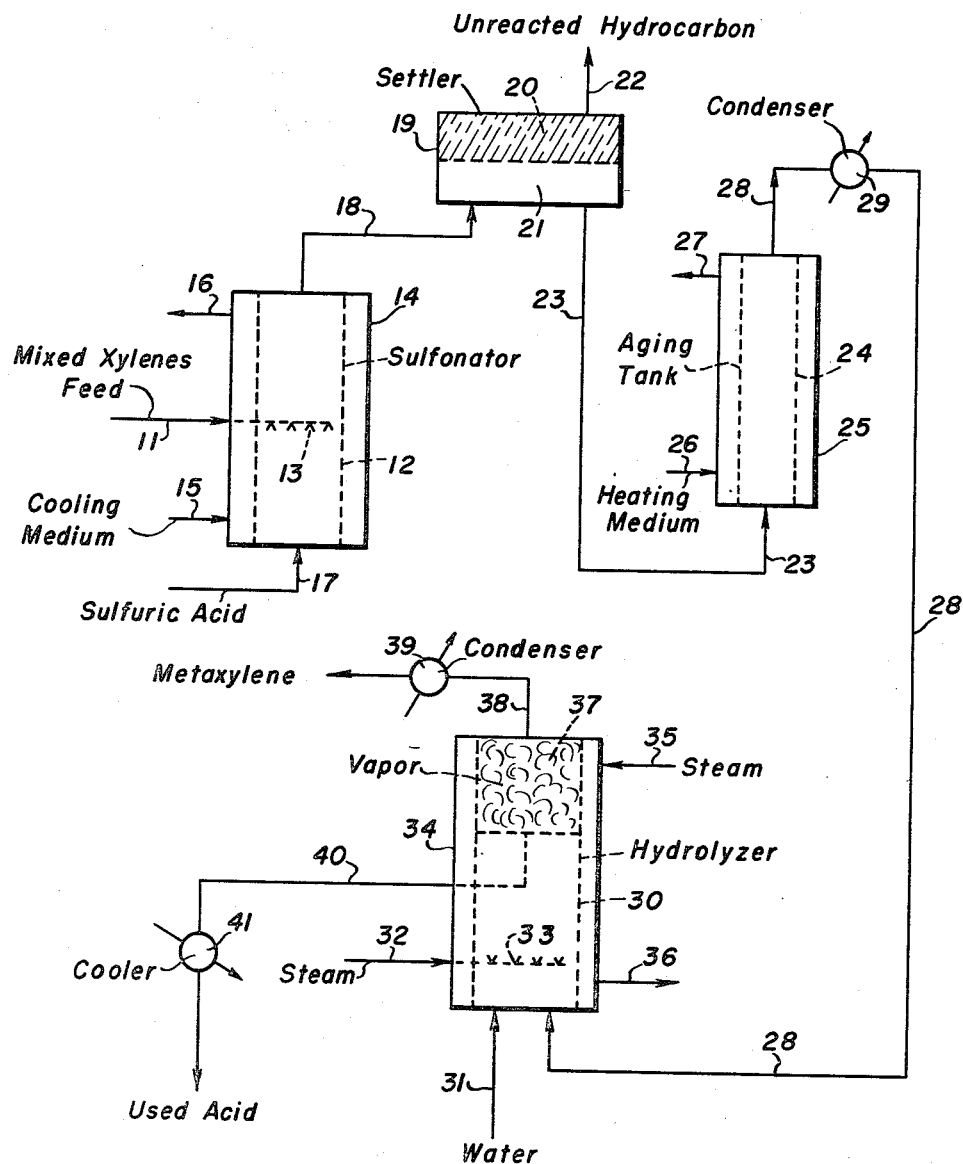
INVENTORS.
Albert J. Shmidl,
John M. Powers,
BY
AGENT.

UNITED STATES PATENT OFFICE 2,688,644

PURIFICATION OF METAXYLENE

Albert J. Shmidl, Houston, and John M. Powers, Baytown, Tex., assignors, by mesne assignments, to Standard Oil Development Company, Elizabeth, N. J., a corporation of Delaware Application September 1, 1950, Serial No. 182,654

1 Claim. (Cl. 260—674)

The present invention is directed to the purification of metaxylene and, more particularly, is directed to the separation of metaxylene from its mixtures with at least one other isomer thereof and from mixtures containing other aromatic hydrocarbons.

The present invention may be described briefly as involving a method for separating metaxylene from a mixture of it with at least one other isomeric xylene in which the mixture is contacted under sulfonating conditions at temperatures no greater than 140° F. with sulfuric acid of a sulfonating strength in the range between 75% and 90% $H_2SO_4$. The sulfuric acid and the mixture containing metaxylene are contacted over a period from about 1 to about 8 hours with the ratio of acid to metaxylene being in the range from about 0.1 to 2.5 moles per mole of metaxylene and preferably in the range from about 1 to 2 moles per mole of metaxylene. After the period of time of acid addition, the reaction mixture is permitted to settle to form a hydrocarbon layer and an acid layer which is a clear solution, when C. P. sulfuric acid is employed, which contains sulfonated xylenes as well as some dissolved unsulfonated aromatic hydrocarbons. The acid layer is separated from the hydrocarbon layer and is then aged for a period of time ranging from at least 15 minutes up to as much as 168 hours or more if necessary. This aging operation is believed to cause sulfonation of unsulfonated aromatic hydrocarbons. The aging operation is conducted at a temperature in the range from 70° F. to 285° F. but preferably in the range from 200° to 250° F. and preferably for a time in the range from about 1 to about 3 hours. After the aging operation the aged acid layer is then hydrolyzed by addition of water and steam thereto. About ½ to about 2 volumes of water to every volume of acid layer may be employed with the preferred amount being an equal volume of water to that of the acid layer. The temperature of the acid layer to which water has been added is then adjusted to a temperature in the range between 280° and 287° F. to cause hydrolysis of the sulfonated metaxylene. Superheated steam may be passed into the mixture during the hydrolysis operation which causes the regenerated metaxylene to vaporize and allows it to be withdrawn and condensed for recovery.

The present invention may be employed on feed stocks containing from about 20% to about 80% by volume of metaxylene with the preferred concentration of metaxylene in the feed stock being in the range from about 30% to about 80%. Other feed mixtures may be employed, of course, but the desired purity may not be obtainable with the ease such as when a feed stock containing the desired concentrations are employed. Analyses illustrative of typical feed stocks to be employed in the practice of the present invention may be found in Table I.

Table I

| Composition | 1 | 2 |
|---|---|---|
| Toluene | 1.9 | 2.2 |
| Ethylbenzene | 18.8 | 29.8 |
| Paraxylene | 15.6 | 22.4 |
| Metaxylene | 42.9 | 20.6 |
| Orthoxylene | 20.8 | 25.0 |

The sulfuric acid employed in the practice of the present invention should have an effective acid strength in the range from 75% to 90% of $H_2SO_4$. It is understood that to maintain the effective acid strength during the sulfonation reaction due to the formation of water it may be desirable to add a stronger acid, such as one containing up to 98% $H_2SO_4$. Acids containing an excess of $SO_3$ should not be employed since such acids have little or no selectivity for the metaxylene. As stated, the ratio of acid to metaxylene is 0.1 to 2.5 moles per mole of metaxylene and is preferably in the range from 1 to 2 moles per mole. Acid is preferably added to the hydrocarbon fraction with agitation thereof over a period of time from about 1 to 8 hours.

The aging operation should preferably be at a temperature in the range from 200° to 250° F. and preferably for a time in the range from about 1 to 3 hours. It is possible to age the acid layer at room temperature, about 70° F., but at these temperatures longer aging time will be required such as one week or more. At the high temperatures as little as 15 minutes may be sufficient. Some caution should be exercised when employing the upper temperature for the aging operation since at the higher temperature decomposition of the sulfonates will begin. It is theorized that the aging operation causes sulfonation of the dissolved, unsulfonated hydrocarbons in the acid layer.

Although it is desirable to use clear sulfuric acid, it is possible to use recovered sulfuric acid which may contain some carbonaceous matter.

The present invention will be further illustrated by reference to the single figure which is a flow diagram of a preferred mode of practicing the invention.

Referring now to the drawing, numeral 11 designates a feed line through which a feed mixture containing metaxylene and other isomeric xylenes, such as illustrated in Table I, is introduced into a sulfonator 12 through jets or distributors 13. Sulfonator 12 is provided with a jacket 14 or other means for controlling the temperature into which may be introduced by line 15 a cooling medium which may be discharged by line 16. Sulfuric acid of a sulfonating strength in the range given before is introduced from a source not shown into sulfonator 12 by line 17 and contacts countercurrently the xylene feed which is sprayed downwardly in sulfonator 12 through sprays or jets 13. The mixture is contacted intimately in sulfonator 12 and the reaction mixture is withdrawn therefrom by line 18 and discharged into a settler 19 which is of sufficient size and capacity to allow a residence time sufficient to form a hydrocarbon layer 20 indicated by the shaded portion and an acid layer 21. The acid layer contains sulfonated xylenes as well as dissolved unsulfonated hydrocarbons. The unreacted hydrocarbons may be withdrawn from settler 19 by line 22 and may be used for other purposes or may be recycled to line 11.

The acid layer is withdrawn from settler 19 by line 23 and is introduced thereby into an aging tank 24 which is provided with a jacket 25 into which may be introduced by line 26 a heating means, such as steam, which is discharged by line 27. Conditions are adjusted in aging tank 24 to include a temperature in the range from 70° to 285° F. For the purposes of this description it may be assumed that the temperature in the aging tank 24 is about 250° F. and that the acid layer is held therein for about 5 hours. Under these conditions, it is believed that the dissolved hydrocarbons are sulfonated. After the required time has elapsed at the stated temperature, the aged acid layer is withdrawn by line 28 and passed to condenser 29 through which a cooling medium, such as water, is circulated. The aged extract is then introduced by line 28 into hydrolyzer 30 which is maintained at a temperature in the range between 280° and 287° F. and preferably with a vapor temperature of 285° F. in the upper portion thereof. Water in the amount stated before is introduced into hydrolyzer 30 by line 31 and superheated steam may also be introduced thereto by lines 32 and spray jets 33. Hydrolyzer 30 is provided with a jacket 34 into which steam may be introduced by line 35 and discharged therefrom by line 36. Under the conditions obtaining in hydrolyzer 30 the metaxylene is released as a vapor 37 and the metaxylene is withdrawn by line 38, passed through condenser 39 and the purified metaxylene discharged from the system. Condenser 39 may be provided with usual means for routing water or other cooling means thereto. The used acid is withdrawn from hydrolyzer 30 by line 40 which terminates in hydrolyzer 30 immediately below the interface between the acid and the vapor phase. The used acid is cooled in cooler 41 and discharged by line 40 from the system for further use or for reconcentration and/or recovery.

From the foregoing description taken with the drawing, it will be seen that a simple, readily adaptable process is provided wherein substantially pure metaxylene may be recovered from its mixtures by sulfonating it to form an acid layer which is aged to allow the recovery therefrom by subsequent hydrolysis of substantially pure metaxylene.

In order to illustrate the invention further, mixtures of xylene, such as illustrated in Table I, were contacted in sulfonation equipment at temperatures in the range from 60° to 125° F. with 2 moles of 96% sulfuric acid per mole of xylene for periods of time from 0.5 to 2 hours. The acid extracts from these runs were then aged and heated prior to hydrolysis at 287° F. The data presented in Table II show a comparison of the composition of metaxylene fractions obtainable in accordance with the present invention after aging for 1 week at 75° F. and heating to 245° F. for 5 hours, respectively, with merely settling at room temperature for 24 hours. The data in column 1 shows the settling for 24 hours whereas the other two columns illustrate the practice of the present invention.

Table II

| Treatment of Extract Prior to Hydrolysis | Settled 24 Hours | Aged One Week at 75° F. | Heated to 245° F. for Five Hours |
|---|---|---|---|
| Yield of Hydrocarbon at 287° F.: Volume Percent of Undiluted Extract— | | | |
| Total Aromatics | 38.2 | 35.8 | 33.4 |
| Metaxylene | 31.4 | 31.6 | 31.6 |
| Composition of Aromatics, Wt. Percent: | | | |
| Toluene | 1.0 | 0.5 | 0.1 |
| Ethylbenzene | 7.0 | 4.1 | 0.5 |
| Paraxylene | 6.1 | 3.9 | 2.0 |
| Metaxylene | 82.0 | 88.4 | 94.9 |
| Orthoxylene | 3.8 | 3.1 | 2.5 |

From these data it will be seen that when the acid extract is merely settled at about room temperature for about 24 hours the recovered metaxylene fraction contains 82% of metaxylene but if the acid extract is aged for one week at 75° F. the purity is raised to 88.4% and heating to 245° F. for 5 hours allows the recovery by hydrolysis of a fraction containing approximately 95% metaxylene. It will be noted from the data in the foregoing table that the amount of metaxylene remained essentially constant yet the concentration of metaxylene in the product was increased by aging and heating the extract. In order to illustrate the invention further, portions of the acid extract obtained, as described before, were aged and heated at 200–250° F. for 1 hour and for 3 hours. These results are compared in Table III with the results obtained on hydrolysis of an extract held at a temperature of 75° F. for about one week.

Table III

| Temperature, ° F | 75 | 200 | | 250 | |
|---|---|---|---|---|---|
| Time, Hours | 168 | 1 | 3 | 1 | 3 |
| Hydrocarbon Recovered, on Hydrolyses to 287° F., Vol. Percent of Extract | 43 | 39.5 | 37.7 | 37.5 | 37.5 |
| Hydrocarbon Analysis, Wt. Percent: | | | | | |
| Toluene | 0.9 | 0.5 | 0.5 | 0.2 | 0.1 |
| Ethylbenzene | 5.3 | 3.9 | 3.1 | 0.8 | 0.6 |
| Paraxylene | 4.3 | 3.2 | 2.7 | 1.6 | 1.3 |
| Metaxylene | 85.2 | 90.8 | 92.6 | 96.2 | 96.9 |
| Orthoxylene | 4.3 | 1.6 | 1.1 | 1.2 | 1.1 |

The data in the foregoing table show that aging for 3 hours at 200° F. was insufficient to obtain the highest purity metaxylene, whereas after 1 hour at 250° F. the purity of metaxylene was over 96%; increasing the time at 250° F. raised the purity of metaxylene only slightly.

The nature and objects of the present invention having been completely described and illustrated, what we wish to claim as new and useful and to secure by Letters Patent is:

A method for separating metaxylene from a mixture of it with $C_8$ aromatic hydrocarbons which comprises the steps of contacting the mixture under sulfonating conditions including a temperature in the range between 60° and 125° F. with sulfuric acid having an effective strength in the range between 75% and 90% $H_2SO_4$ to sulfonate said metaxylene and to form a hydrocarbon layer and an acid layer containing sulfonated and unsulfonated xylenes, separating said acid layer from the hydrocarbon layer, aging the total separated acid layer by holding same at a temperature in the range between 200° and 250° F. for a time in the range between 1 and 3 hours while preventing decomposition of the sulfonated xylene, and hydrolyzing the total aged acid layer at a temperature in the range between 280° and 287° F. to recover metaxylene therefrom.

References Cited in the file of this patent

UNITED STATES PATENTS

| Number | Name | Date |
|---|---|---|
| 1,311,848 | Lepers | July 29, 1919 |
| 2,348,329 | Cole et al. | May 9, 1944 |
| 2,393,888 | Cole | Jan. 29, 1946 |
| 2,511,711 | Hetzner et al. | June 13, 1950 |
| 2,519,336 | Beach et al. | Aug. 22, 1950 |